United States Patent
Murata et al.

(10) Patent No.: US 10,490,117 B2
(45) Date of Patent: Nov. 26, 2019

(54) RECEPTION DEVICE AND TRANSMISSION/RECEPTION SYSTEM

(71) Applicant: THINE ELECTRONICS, INC., Tokyo (JP)

(72) Inventors: Yusuke Murata, Tokyo (JP); Satoshi Miura, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/670,167

(22) Filed: Aug. 7, 2017

(65) Prior Publication Data
US 2018/0047331 A1    Feb. 15, 2018

(30) Foreign Application Priority Data
Aug. 12, 2016   (JP) .................. 2016-158969

(51) Int. Cl.
G09G 3/20      (2006.01)
G09G 5/12      (2006.01)
H04N 21/242    (2011.01)

(52) U.S. Cl.
CPC ............ *G09G 3/2096* (2013.01); *G09G 5/12* (2013.01); *H04N 21/242* (2013.01); *G09G 2330/00* (2013.01); *G09G 2330/06* (2013.01); *G09G 2370/00* (2013.01)

(58) Field of Classification Search
CPC ........................... G09G 3/2096; H04N 21/242
USPC .................. 348/500, 473; 713/169; 709/219; 345/87
See application file for complete search history.

(56) References Cited

U.S. PATENT DOCUMENTS

| | | | | |
|---|---|---|---|---|
| 6,035,126 A | * | 3/2000 | Wise | G06F 9/3867 712/29 |
| 6,914,637 B1 | * | 7/2005 | Wolf | H04L 1/0057 348/473 |
| 7,088,398 B1 | * | 8/2006 | Wolf | H04L 1/0057 348/423.1 |
| 7,864,153 B2 | * | 1/2011 | Yun | G09G 3/2092 345/99 |
| 8,098,223 B2 | * | 1/2012 | Yun | G09G 3/2092 345/99 |
| 8,606,949 B2 | * | 12/2013 | Wogsberg | H04N 7/181 709/231 |
| 9,549,011 B2 | * | 1/2017 | Wogsberg | H04N 7/181 |
| 9,736,699 B1 | * | 8/2017 | Rao | H04W 16/14 |

(Continued)

FOREIGN PATENT DOCUMENTS

JP    2009-135801 A    6/2009

*Primary Examiner* — Brian P Yenke
*Assistant Examiner* — Sean N. Haiem
(74) *Attorney, Agent, or Firm* — Sughrue Mion, PLLC

(57) ABSTRACT

The present embodiments relate to a reception device that enables accurate separation of video data and SYNC data sent out from a transmission device in accordance with a data enable (DE) signal, from among reception data even if the reception data deteriorates due to noise. The reception device separates the video data and the SYNC data from the reception data in accordance with the DE signal reproduced using a detection result of the BS data and the BE data representing a transition timing of a signal level of the DE signal and a prediction result of detection timings of the BS data and the BE data or a prediction result of the transition timing of the DE signal.

12 Claims, 12 Drawing Sheets

(56) References Cited

U.S. PATENT DOCUMENTS

| | | | |
|---|---|---|---|
| 2007/0016778 A1* | 1/2007 | Lyle | H04L 9/12 713/169 |
| 2007/0229418 A1* | 10/2007 | Yun | G09G 3/2092 345/87 |
| 2011/0063271 A1* | 3/2011 | Yun | G09G 3/2092 345/208 |
| 2013/0246576 A1* | 9/2013 | Wogsberg | H04N 7/181 709/219 |
| 2014/0223024 A1* | 8/2014 | Wogsberg | H04N 7/181 709/231 |

\* cited by examiner

RECEPTION DEVICE AND TRANSMISSION/RECEPTION SYSTEM

BACKGROUND OF THE INVENTION

Field of the Invention

The present invention relates to a reception device and a transmission/reception system.

Related Background Art

A transmission/reception system configured to transfer video data for displaying images data to a video display device such as a liquid crystal display device is disclosed in Japanese Patent Application Laid-Open No. 2009-135801 (Patent Document 1). This transmission/reception system disclosed in Patent Document 1 includes a transmission device configured to send out video data as well as SYNC data which is control information for instructing display control for the video data, and a reception device configured to receive the video data and the SYNC data sent out from the transmission device and display the video data on a predetermined video display device.

In the transmission/reception system, the transmission device accepts the input of the video data and the SYNC data to be sent out to the reception device and also accepts the input of data enable signal (hereinafter referred to as "DE signal"). Then, the transmission device sends out the video data to the reception device during a period in which the DE signal is at a first level (for example, a high level; hereinafter referred to as "H level") and sends out the SYNC data to the reception device during a period (blanking period) in which the DE signal is at a second level (for example, a low level; hereinafter referred to as "L level"). In addition, the transmission device sends out BS data (blanking start data) representing a timing at which the DE signal transits from the first level to the second level to the reception device and sends out BE data (blanking end data) representing a timing at which the DE signal transits from the second level to the first level to the reception device.

The reception device receives the video data, the SYNC data, the BS data, and the BE data sent out from the transmission device. Then, the reception device detects the BS data and the BE data from among the received data and reproduces the DE signal on the basis of timings at which these pieces of data are detected. In addition, the reception device separates the video data and the SYNC data from among the received data on the basis of this reproduced DE signal.

SUMMARY OF THE INVENTION

As a result of examining the conventional transmission/reception system, the inventors found the following problems. That is, in the conventional transmission/reception system as described above, when data is transferred from the transmission device to the reception device by way of a transmission path, noise is sometimes temporarily superimposed on the data due to an external cause such as static electricity. Due to this noise, reception data received by the reception device is different from transmission data sent out by the transmission device in some cases.

If the reception device cannot detect the BS data or the BE data at timings when these pieces of data should be received, the reception device cannot accurately reproduce the DE signal after those timings. If the reception device cannot accurately reproduce the DE signal, the reception device will erroneously treat data which is actually the video data as the SYNC data, or conversely, erroneously treat data which is actually the SYNC data as the video data. As a result, in the video display device that accepts the input of the video data and the SYNC data outputted from the reception device, displayed video data is largely disturbed.

The present invention has been made to solve the above-described problems and it is an object of the present invention to provide a reception device capable of accurately separating video data and SYNC data from among reception data even if the reception data deteriorates due to noise, and a transmission/reception system including such a reception device.

To achieve the above object, a reception device according to the present embodiments is a device that receives transmission data from a transmission device, where the transmission data includes at least video data, SYNC data, BS data, and BE data. The video data is sent out from a transmission device during a period in which a data enable (DE) signal is at a first level. The SYNC data includes a control signal for instructing display control such as a synchronization timing when the video data is displayed on a predetermined display device, which is sent out from the transmission device during a period in which the DE signal is at a second level. The BS data includes a signal representing a timing at which the DE signal transits from the first level to the second level. The BE data includes a signal representing a timing at which the DE signal transits from the second level to the first level. This reception device includes at least a detection unit, a prediction unit, a DE signal prediction reproduction unit, and a separation unit. The detection unit detects the BS data and the BE data from among reception data captured by the reception device. The prediction unit predicts timings at which the detection unit should detect the BS data and the BE data or a timing at which a signal level of the DE signal should transit. The DE signal prediction reproduction unit uses timings at which the detection unit detected the BS data and the BE data and a prediction result of the prediction unit (predicted detection timings of the BS data and the BE data or a transition timing of the signal level of the DE signal) to reproduce the DE signal. The separation unit separates the video data and the SYNC data from among the reception data in accordance with the DE signal reproduced by the DE signal prediction reproduction unit.

DETAILED DESCRIPTION

Figure 1:
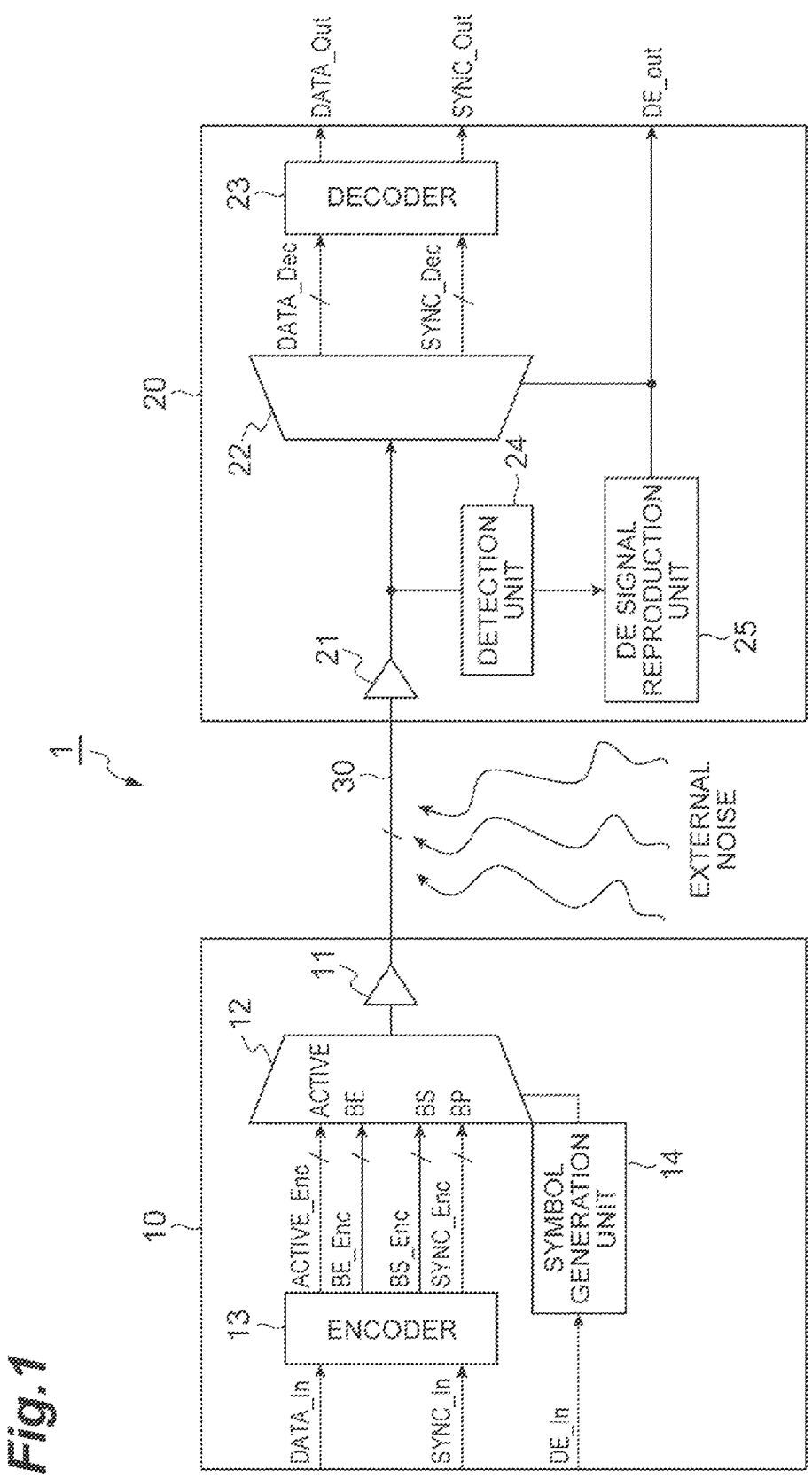
FIG. 1 is a diagram illustrating a configuration of a transmission/reception system 1 according to a comparative example.

[Description of Embodiments According to Invention of Present Application]

First, the contents of the respective embodiments according to the invention of the present application will be individually listed and described.

(1) As one aspect of the present embodiments, a reception device according thereto is a device that receives sent data from a transmission device, where the transmission data includes at least video data, SYNC data, BS data, and BE data. The video data is sent out from a transmission device during a period in which a data enable (DE) signal is at a first level. The SYNC data includes control information for instructing display control such as synchronization control when the video data is displayed on a predetermined display device, which is sent out from the transmission device during a period in which the DE signal is at a second level. The BS data includes a signal representing a timing at which the DE signal transits from the first level to the second level. The BE data includes a signal representing a timing at which the DE signal transits from the second level to the first level. This reception device includes at least a detection unit, a prediction unit, a DE signal prediction reproduction unit, and a separation unit. The detection unit detects the BS data and the BE data from among reception data captured by the reception device. The prediction unit predicts timings at which the detection unit should detect the BS data and the BE data or a timing at which a signal level of the DE signal should transit. The DE signal prediction reproduction unit uses timings at which the detection unit detected the BS data and the BE data and a prediction result of the prediction unit (predicted detection timings of the BS data and the BE data or a transition timing of the signal level of the DE signal) to reproduce the DE signal. The separation unit separates the video data and the SYNC data from among the reception data in accordance with the DE signal reproduced by the DE signal prediction reproduction unit.

(2) As one aspect of the present embodiments, it is favorable that the prediction unit predicts next timings at which the detection unit should detect the BS data and the BE data, from information regarding past detection timings including timings at which the detection unit detected the BS data and the BE data. In this case, as one aspect of the present embodiments, it is favorable that the prediction unit includes a first measurement unit, a second measurement unit, and a storage unit. Note that the first measurement unit measures a time interval of a timing at which the detection unit detected the BS data. The second measurement unit measures a time interval of a timing at which the detection unit detected the BE data. The storage unit stores the time interval measured by each of the first measurement unit and the second measurement unit. Meanwhile, as one aspect of the present embodiments, the prediction unit may be configured with a single measurement unit and a storage unit. Note that the single measurement unit measures a first time from the detection of the BE data to the detection of the BS data by the detection unit and also measures a second time from the detection of the BS data to the detection of the BE data by the detection unit. In this case, the storage unit stores the first time and the second time measured by the measurement unit.

(3) As one aspect of the present embodiments, the prediction unit may predict a next timing at which the signal level of the DE signal should transit, using information regarding transition timings of the signal levels of past intermediate DE signals including an intermediate DE signal generated from timings at which the detection unit detected the BS data and the BE data. In this case, as one aspect of the present embodiments, it is favorable that the prediction unit includes a first measurement unit, a second measurement unit, and a storage unit. Note that the first measurement unit measures a time interval of a timing at which the intermediate DE signal transited from an H level (high level) to an L level (low level). The second measurement unit measures a time interval of a timing at which the intermediate DE signal transited from the L level to the H level. The storage unit stores the time interval measured by each of the first measurement unit and the second measurement unit. Meanwhile, as one aspect of the present embodiments, the prediction unit may be configured with a single measurement unit and a storage unit. Note that the single measurement unit measures a first time during which the intermediate DE signal is at the L level and also measures a second time during which the intermediate DE signal is at the H level. The storage unit stores the first time and the second time measured by the measurement unit.

(4) As one aspect of the present embodiments, the prediction unit may use an externally set data (BE/BS cycle) to predict timings at which the detection unit detects the BS data and the BE data or a timing at which the signal level of the DE signal should transit.

(5) As one aspect of the present embodiments, the DE signal prediction reproduction unit compares timings at which the detection unit detected the BS data and the BE data with a prediction result of the prediction unit. When the both are different from each other, the DE signal prediction reproduction unit reproduces the DE signal using the prediction result of the prediction unit. On the other hand, when the both are the same, it is favorable that the DE signal prediction reproduction unit reproduces the DE signal using the timings at which the detection unit detected the BS data and the BE data. Furthermore, as one aspect of the present embodiments, when the comparison between the timings at which the detection unit detected the BS data and the BE data and the timing predicted by the prediction unit continuously results in a difference between the both for a predetermined number of times or more, the DE signal prediction reproduction unit reproduces the DE signal using the prediction result of the prediction unit. In other cases, it is also favorable that the DE signal prediction reproduction unit reproduces the DE signal using the timings at which the detection unit detected the BS data and the BE data. In addition, as one aspect of the present embodiments, it is also favorable that the DE signal prediction reproduction unit reproduces the DE signal by always giving priority to the timing predicted by the prediction unit.

(6) A transmission/reception system according to the present embodiments includes a transmission device and the reception device according to one of the various aspects described above. The transmission data from the transmission device includes the video data sent out during a period in which the DE signal is at the first level, the SYNC data sent out during a period in which the DE signal is at the second level, the BS data representing a timing at which the DE signal transits from the first level to the second level, and the BE data representing s timing at which the DE signal transits from the second level to the first level. The reception device receives the transmission data sent out from the transmission device.

Each aspect listed in this section of [Description of Embodiments according to Invention of Present Application] described thus far can be applied to each of all the remaining aspects or to all combinations of these remaining aspects.

[Details of Embodiments According to Invention of Present Application]

Hereinafter, specific structures of reception devices and transmission/reception systems according to the present embodiments will be described in detail with reference to the attached drawings. Note that the present invention is not limited to these examples but is indicated by the claims and intended to include meanings equivalent to the claims and all modifications within the scope thereof. In addition, in the description of the drawings, the same elements are denoted by the same reference numerals and duplicate explanations will be omitted.

First, a configuration according to a comparative example will be described and then, configurations according to the present embodiments will be described.

Comparative Example

Figure 2:
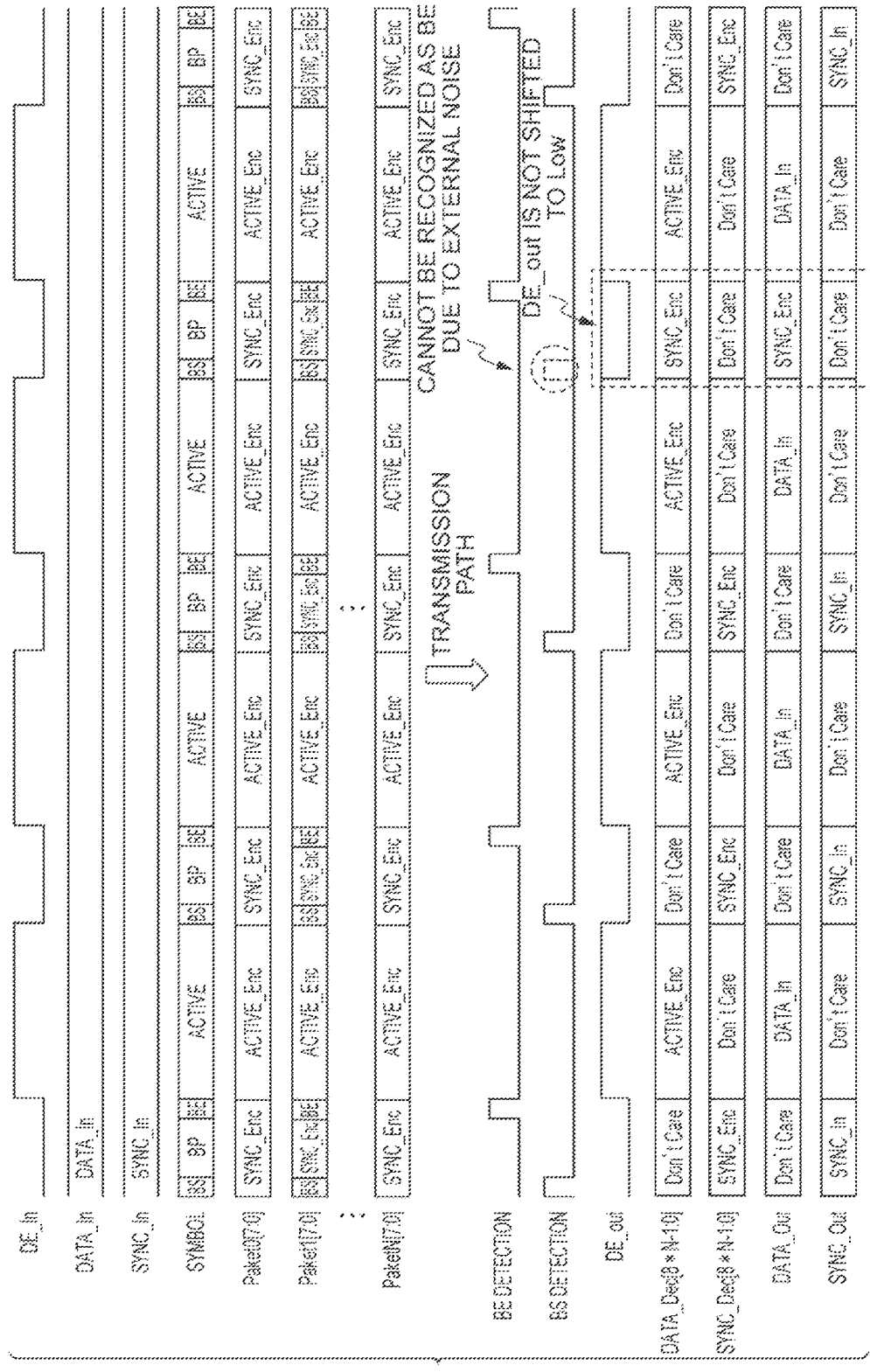
FIG. 2 is a timing chart for explaining respective signals in the transmission/reception system 1 according to the comparative example.

FIG. 1 is a diagram illustrating a configuration of a transmission/reception system 1 according to the comparative example. FIG. 2 is a timing chart for explaining respective signals in the transmission/reception system 1 according to the comparative example. This transmission/reception system 1 includes a transmission device 10 and a reception device 20. Transmission data from the transmission device 10 is transferred via a transmission path 30 to arrive at the reception device 20 and is transmitted by the reception device 20.

The transmission device 10 includes a driver 11, a multiplexer 12, an encoder 13, and a symbol generation unit 14. The symbol generation unit 14 accepts the input of a data enable signal (DE signal) DE_In and generates one of an ACTIVE symbol, a BS symbol, a BE symbol, and a BP symbol in accordance with the level or level transition of this signal DE_In to give the one of these symbols to the multiplexer 12. The symbol generation unit 14 generates the ACTIVE symbol during a period in which the signal DE_In is at an H level, generates the BS symbol during a period in which the signal DE_In transits from the H level to an L level, generates the BE symbol during a period in which the signal DE_In transits from the L level to the H level, and generates the BP symbol instructing SYNC data (SYNC_In) during a period other than periods for the BS symbol and the BE symbol while the signal DE_In is at the L level.

The encoder 13 accepts the input of video data (DATA_In) and the SYNC data (SYNC_In) to be sent out to the reception device 20 and encodes these pieces of data.

The encoder 13 outputs, to the multiplexer 12, data ACTIVE_Enc obtained by encoding the data DATA_In, data BS_Enc obtained by encoding the data SYNC_In and the BS data, data BE_Enc obtained by encoding the data SYNC_In and the BE data, and data SYNC_Enc obtained by encoding the data SYNC_In.

For example, while the data DATA_In and the data SYNC_In are 8-bit data, the encoded data (ACTIVE_Enc, BS_Enc, BE_Enc, and SYNC_Enc) is 8N-bit data. However, N is an integer equal to or larger than two and depends on a transfer band (total number of bits). Since the band of the data SYNC_In is small compared with the band of the data DATA_In, the BS data and the BE data can be embedded in the encoded data. In the example illustrated in FIG. 2, the data BS_Enc and BE_Enc are embedded in Paket1 [7:0] of the encoded data of 8N bits.

The multiplexer 12 accepts the input of the symbols (ACTIVE, BS, BE, and BP) generated by the symbol generation unit 14 and also accepts the input of the encoded data (ACTIVE_Enc, BS_Enc, BE_Enc, and SYNC_Enc) generated by the encoder 13, thereby selectively outputting one piece of the encoded data in accordance with the symbol that has been input. When the input symbol is the ACTIVE symbol, the multiplexer 12 outputs the data ACTIVE_Enc to the driver 11 and, when the input symbol is the BS symbol, outputs the data BS_Enc to the driver 11. When the input symbol is the BE symbol, the multiplexer 12 outputs the data BE_Enc to the driver 11 and, when the input symbol is the BP symbol, outputs the data SYNC_Enc to the driver 11.

The driver 11 sends out the data outputted from the multiplexer 12 to the transmission path 30. The data that has been sent out is received by the reception device 20 by way of the transmission path 30.

The reception device 20 includes a receiver 21, a demultiplexer 22, a decoder 23, a detection unit 24, and a DE signal reproduction unit 25. The receiver 21 receives data that has been sent out from the transmission device 10, transferred via the transmission path 30, and then has arrived thereat. The detection unit 24 detects the BS data and the BE data from among the data received by the receiver 21.

The DE signal reproduction unit 25 reproduces DE signal DE_Out on the basis of timings at which the detection unit 24 detected the BS data and the BE data. The signal level of this signal DE_Out transits from the H level to the L level at a timing when the detection unit 24 detects the BS data and transits from the L level to the H level at a timing when the detection unit 24 detects the BE data. The DE signal reproduction unit 25 gives this signal DE_Out to the demultiplexer 22.

The demultiplexer 22 accepts the input of the signal DE_Out outputted from the DE signal reproduction unit 25 and also accepts the input of the data received by the receiver 21. The demultiplexer 22 is a separation unit that separates the reception data into the video data and the SYNC data in accordance with the signal level of the signal DE_Out. The demultiplexer 22 outputs the data received during a period in which the signal DE_Out is at the H level as the video data (DATA_Dec) and outputs the data received during a period in which the signal DE_Out is at the L level as the SYNC data (SYNC_Dec). During a period in which the signal DE_Out is at the H level, the data DATA_Dec serves as data corresponding to the data ACTIVE_Enc and the data SYNC_Dec serves as Don't Care. During a period in which the signal DE_Out is at the L level, the data DATA_Dec serves as Don't Care and the data SYNC_Dec serves as data corresponding to BS_Enc, BE_Enc, and SYNC_Enc.

The decoder 23 decodes the data DATA_Dec outputted from the demultiplexer 22 to output the video data (DATA_Out) and also decodes the data SYNC_Dec outputted from the demultiplexer 22 to output the SYNC data (SYNC_Out).

The signal DE_Out outputted from the reception device 20 is data obtained by reproducing the signal DE_In input to the transmission device 10. The data DATA_Out outputted from the reception device 20 is data obtained by reproducing the data DATA_In input to the transmission device 10. The data SYNC_Out outputted from the reception device 20 is data obtained by reproducing the data SYNC_In input to the transmission device 10.

The data transmitted from the transmission device 10 to the reception device 20 is, for example, data to which 8B10B encoding (generally denoted as "8b/10b") is applied. At this time, the data ACTIVE_Enc and SYNC_Enc are D codes (symbols allocated to data) among 8B10B-encoded data and the data BS_Enc and BE_Enc are K codes (control symbols other than the D codes) among 8B10B-encoded data. The 8B10B encoding is frequently used in serial transfer and is used in, for example, USB and Display-Port.

In both of the D code and the K code, 8-bit data is encoded into 10-bit data. In addition, in both of the D code and K code, two pieces of 10-bit data correspond to one piece of 8-bit data. In general, 8-bit data can represent 256 ($=2^8$) values, whereas 10-bit data can represent 1024 ($=2^{10}$) values. All 8-bit data is encoded into 10-bit data for the D code, while twelve pieces of 8-bit data are encoded into 10-bit data for the K code. Therefore, 10-bit data that can represent 1024 values can include 10-bit data by the D code and 10-bit data by the K code.

For example, when both of 8-bit data and 10-bit data are denoted by binary numbers, 10-bit data of the K code is [00_1111_0100] and [11_0000_1011] and 10-bit data of the D code is [00_1110_1011] and [00_1110_0100] with respect to 8-bit data [0001_1100]. As described above, even when 8-bit data has the same value, 10-bit data of the K code is different from 10-bit data of the D code. Since 10-bit data of the K code never coincides with 10-bit data of the D code, it is possible to identify which of the K code and the D code is applicable for any 10-bit data.

By assigning the data ACTIVE_Enc and SYNC_Enc to data of the D code and assigning the data BS_Enc and BE_Enc to data of the K code, the data DATA_In can be allotted to 256 values. In this case, a transmission band can be secured and additionally, the detection unit 24 can detect the BS data and the BE data from among the reception data.

In the reception device 20 of the comparative example, the detection unit 24 detects the BS data and the BE data from among the reception data and, on the basis of timings at which these BS data and BE data were detected, the DE signal reproduction unit 25 reproduces the signal DE_Out. In a case where noise is superimposed on transmission data due to an external cause such as static electricity when the BS data or the BE data is transferred from the transmission device 10 to the reception device 20 by way of the transmission path 30, the detection unit 24 sometimes cannot detect the BS data or the BE data at timings when these pieces of data should be received. If the detection unit 24 cannot detect the BS data or the BE data, the DE signal reproduction unit 25 cannot accurately reproduce the signal DE_Out. That is, the demultiplexer 22 cannot accurately separate the data DATA_Dec and SYNC_Dec. As a result, in a video display device that accepts the input of the data DATA_Out and SYNC_Out outputted from the reception device 20, a displayed data is largely disturbed.

A timing chart in FIG. 2 illustrates an example in a case where the detection unit 24 could not detect the BS data. In this case, in the comparative example, the signal DE_Out outputted from the DE signal reproduction unit 25 remains at the H level even though a timing at which the signal DE_Out should actually transit from the H level to the L level has come. As a consequence, data which is actually the SYNC data is erroneously treated as the video data and the actual SYNC data will be lost. A transmission/reception system including the reception devices of the present embodiments described below can eliminate such a difficulty.

First Embodiment

Figure 3:
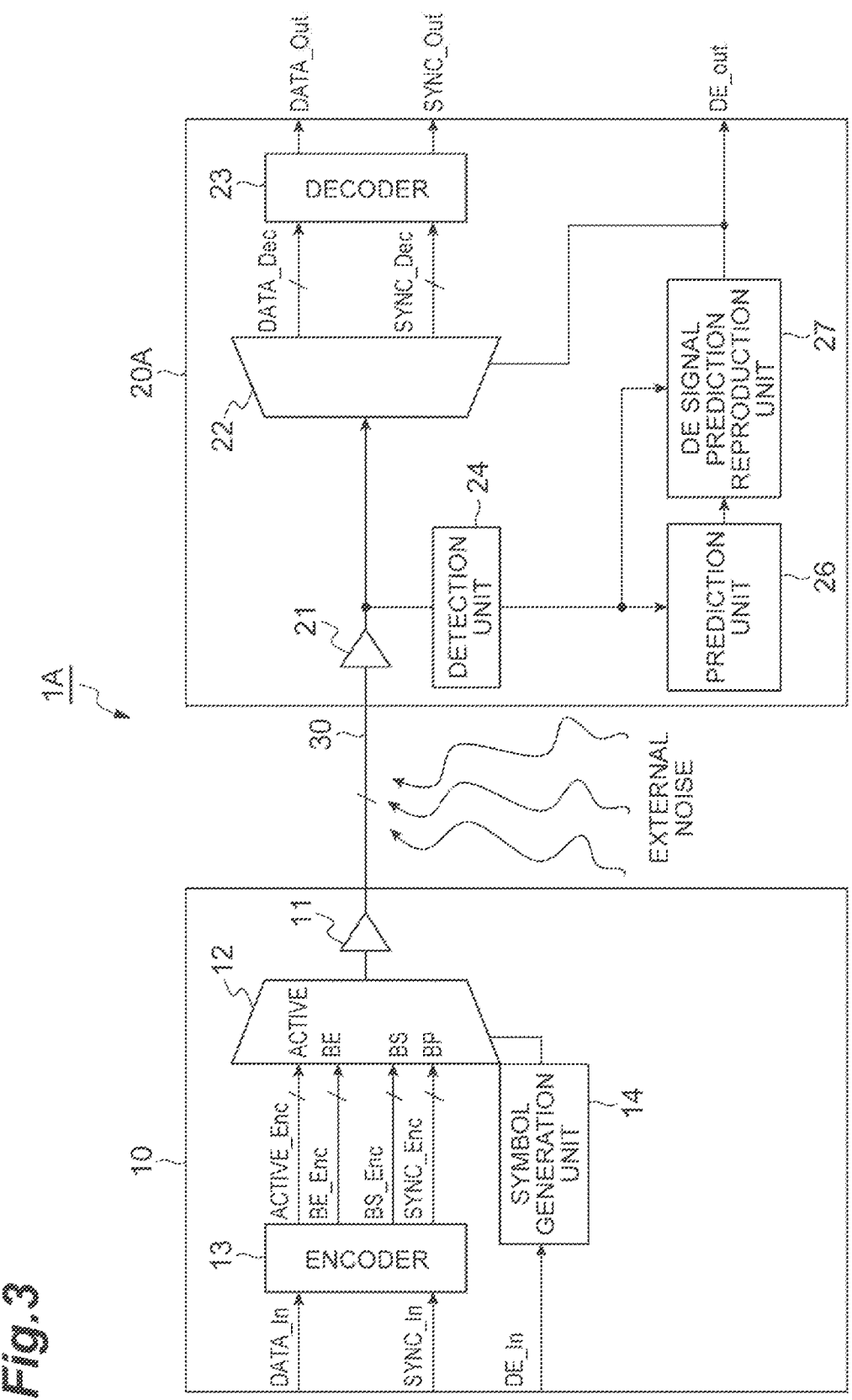
FIG. 3 is a diagram illustrating a configuration of a transmission/reception system 1A according to a first embodiment.
Figure 4:
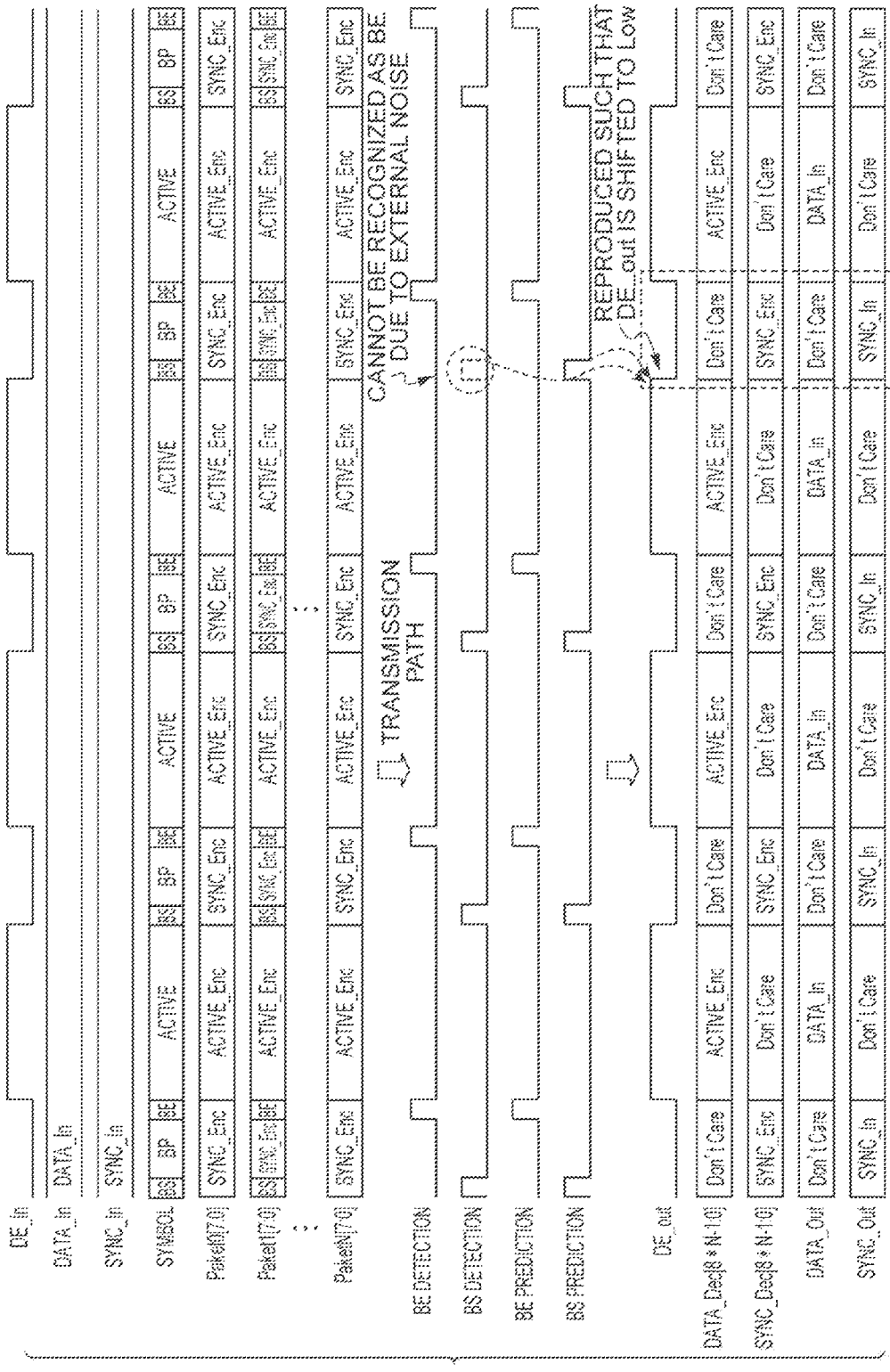
FIG. 4 is a timing chart for explaining respective signals in the transmission/reception system 1A according to the first embodiment.

FIG. 3 is a diagram illustrating a configuration of a transmission/reception system 1A according to a first embodiment. FIG. 4 is a timing chart for explaining respective signals in the transmission/reception system 1A according to the first embodiment. Compared with the configuration of the transmission/reception system 1 according to the comparative example illustrated in FIG. 1, the transmission/reception system 1A according to the first embodiment illustrated in FIG. 3 differs from the transmission/reception system 1 according to the comparative example in that a reception device 20A is provided instead of the reception device 20. In addition, compared with the reception device 20 of the comparative example, the reception device 20A of the first embodiment differs from the reception device 20 of the comparative example in that a prediction unit 26 and a DE signal prediction reproduction unit 27 are provided instead of the DE signal reproduction unit 25. The other configuration of the transmission/reception system 1A according to the first embodiment is the same as the configuration of the transmission/reception system 1 according to the comparative example.

The prediction unit 26 predicts timings at which a detection unit 24 should detect the BS data and the BE data. The prediction unit 26 predicts next timings at which the detection unit 24 should detect the BS data and the BE data, on the basis of information regarding past detection timings including timings at which the detection unit 24 detected the BS data and the BE data. The DE signal prediction reproduction unit 27 reproduces the DE signal (DE_Out) on the basis of timings at which the detection unit 24 detected the BS data and the BE data and a prediction result of the prediction unit 26 and gives this signal DE_Out to a demultiplexer 22.

In the reception device 20A having such a configuration, when the detection unit 24 cannot detect the BS data or the BE data at timings when these pieces of data should be received, the DE signal prediction reproduction unit 27 can reproduce the signal DE_Out on the basis of a timing predicted by the prediction unit 26. Therefore, the demultiplexer 22 can accurately separate the data DATA_Dec and SYNC_Dec and, as a result, video data displayed on a video display device that accepts the input of the data DATA_Out and SYNC_Out outputted from the reception device 20A can be prevented from being largely disturbed.

A timing chart in FIG. 4 illustrates an example in a case where the detection unit 24 could not detect the BS data as in FIG. 2. In this case, in the present embodiments, the signal DE_Out outputted from the DE signal prediction reproduction unit 27 transits from the H level to the L level at a BS data detection timing predicted by the prediction unit 26.

Figure 5:
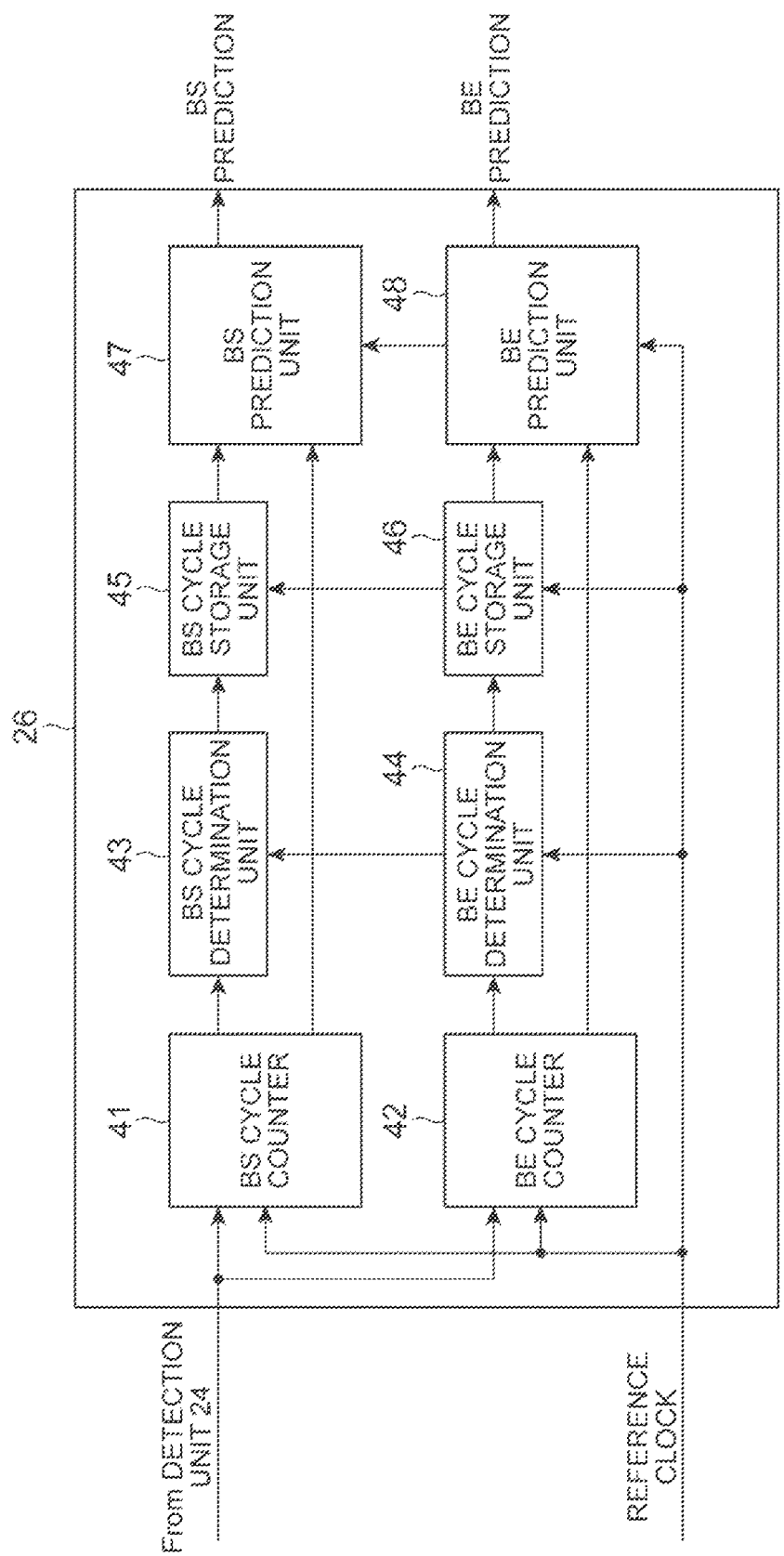
FIG. 5 is a diagram illustrating a configuration example of a prediction unit 26 of a reception device 20A according to the first embodiment.

FIG. 5 is a diagram illustrating a configuration example of the prediction unit 26 of the reception device 20A of the first embodiment. The prediction unit 26 illustrated in FIG. 5 includes a BS cycle counter 41, a BE cycle counter 42, a BS cycle determination unit 43, a BE cycle determination unit 44, a BS cycle storage unit 45, a BE cycle storage unit 46, a BS prediction unit 47, and a BE prediction unit 48. These members operate in accordance with a reference clock.

The BS cycle counter 41 is a first measurement unit that measures a time interval (cycle) of a timing at which the detection unit 24 detected the BS data. The BE cycle counter 42 is a second measurement unit that measures a time interval (cycle) of a timing at which the detection unit 24 detected the BE data. The BS cycle counter 41 and the BE cycle counter 42 can measure the cycles of the BS data and the BE data, respectively, by counting pulses of the reference clock.

The BS cycle determination unit 43 determines whether to cause the BS cycle storage unit 45 to keep a count result by the BS cycle counter 41 (that is, the cycle of the BS data) therein. The BE cycle determination unit 44 determines whether to cause the BE cycle storage unit 46 to keep a count result by the BE cycle counter 42 (that is, the cycle of the BE data) therein.

Since external noise due to static electricity or the like is temporary and occurs randomly in time, the possibility of the cycles of the BS data and the BE data changing continuously due to the influence of the external noise is low. Therefore, when the BS data cycle is continuously the same for a certain number of times (for example, twice) or more in succession, the BS cycle determination unit 43 causes the BS cycle storage unit 45 to keep this BS data cycle therein. In addition, when the BE data cycle is continuously the same for a certain number of times (for example, twice) or more in succession, the BE cycle determination unit 44 causes the BE cycle storage unit 46 to keep this BE data cycle therein. With such operation, it is possible to avoid erroneous cycles from being stored in the BS cycle storage unit 45 and the BE cycle storage unit 46.

When the BS cycle determination unit 43 determines that the cycle of the BS data should be kept, the BS cycle storage unit 45 stores this cycle of the BS data. When the BE cycle determination unit 44 determines that the cycle of the BE data should be kept, the BE cycle storage unit 46 stores this cycle of the BE data.

The BS prediction unit 47 compares a count value by the BS cycle counter 41 (the cycle of BS data detection by the detection unit 24) with the BS data cycle stored in the BS cycle storage unit 45 and predicts a timing at which the detection unit 24 detects the BS data. The BE prediction unit 48 compares a count value by the BE cycle counter 42 (the cycle of BE data detection by the detection unit 24) with the BE data cycle stored in the BE cycle storage unit 46 and predicts a timing at which the detection unit 24 detects the BE data.

Figure 6:
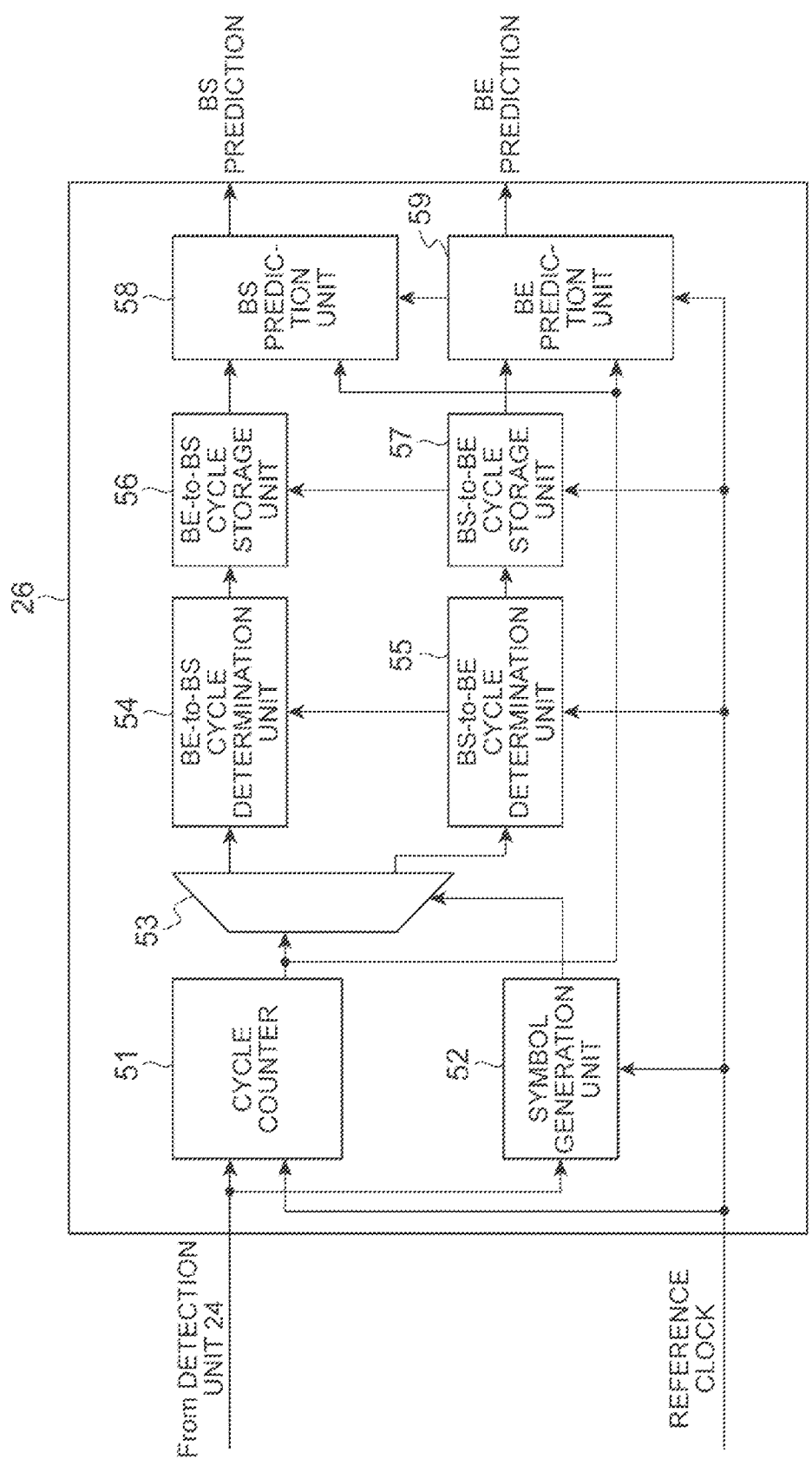
FIG. 6 is a diagram illustrating another configuration example of the prediction unit 26 of the reception device 20A according to the first embodiment.

FIG. 6 is a diagram illustrating another configuration example of the prediction unit 26 of the reception device 20A of the first embodiment. In FIG. 6, the prediction unit 26 includes a cycle counter 51, a symbol generation unit 52, a demultiplexer 53, a BE-to-BS cycle determination unit 54, a BS-to-BE cycle determination unit 55, a BE-to-BS cycle storage unit 56, a BS-to-BE cycle storage unit 57, a BS prediction unit 58, and a BE prediction unit 59. These members operate in accordance with the reference clock.

The cycle counter 51 is a measurement unit that measures a first time (BE-to-BS cycle) from the detection of the BE data to the detection of the BS data by the detection unit 24 and also measures a second time (BS-to-BE cycle) from the detection of the BS data to the detection of the BE data by the detection unit 24. The cycle counter 51 can measure the BE-to-BS cycle and the BS-to-BE cycle by counting pulses of the reference clock.

The symbol generation unit 52 generates the BS symbol and the BE symbol on the basis of timings at which the detection unit 24 detected the BS data and the BE data. When the symbol generation unit 52 generates the BS symbol, the demultiplexer 53 outputs a count result by the cycle counter 51 to the BE-to-BS cycle determination unit 54 as the BE-to-BS cycle. When the symbol generation unit 52 generates the BE symbol, the demultiplexer 53 outputs a count result by the cycle counter 51 to the BS-to-BE cycle determination unit 55 as the BS-to-BE cycle.

The BE-to-BS cycle determination unit 54 determines whether to cause the BE-to-BS cycle storage unit 56 to keep the BE-to-BS cycle outputted from the demultiplexer 53 therein. The BS-to-BE cycle determination unit 55 determines whether to cause the BS-to-BE cycle storage unit 57 to keep the BS-to-BE cycle outputted from the demultiplexer 53 therein. When the BE-to-BS cycle is continuously the same for a certain number of times (for example, twice) or more in succession, the BE-to-BS cycle determination unit 54 causes the BE-to-BS cycle storage unit 56 to keep this BE-to-BS cycle therein. In addition, when the BS-to-BE cycle is continuously the same for a certain number of times (for example, twice) or more in succession, the BS-to-BE cycle determination unit 55 causes the BS-to-BE cycle storage unit 57 to keep this BS-to-BE cycle therein.

When the BE-to-BS cycle determination unit 54 determines that the BE-to-BS cycle should be kept, the BE-to-BS cycle storage unit 56 stores this BE-to-BS cycle. When the BS-to-BE cycle determination unit 55 determines that the BS-to-BE cycle should be kept, the BS-to-BE cycle storage unit 57 stores this BS-to-BE cycle.

The BS prediction unit 58 compares a count value by the cycle counter 51 with the BE-to-BS cycle stored in the BE-to-BS cycle storage unit 56 and predicts a timing at which the detection unit 24 detects the BS data. The BE prediction unit 59 compares a count value by the cycle counter 51 with the BS-to-BE cycle stored in the BS-to-BE cycle storage unit 57 and predicts a timing at which the detection unit 24 detects the BE data.

While it has been necessary to provide two counters in the configuration illustrated in FIG. 5, the configuration illustrated in FIG. 6 is only required to provide one counter and accordingly, is advantageous in terms of reduction in power consumption and reduction in size of device.

Second Embodiment

Figure 7:
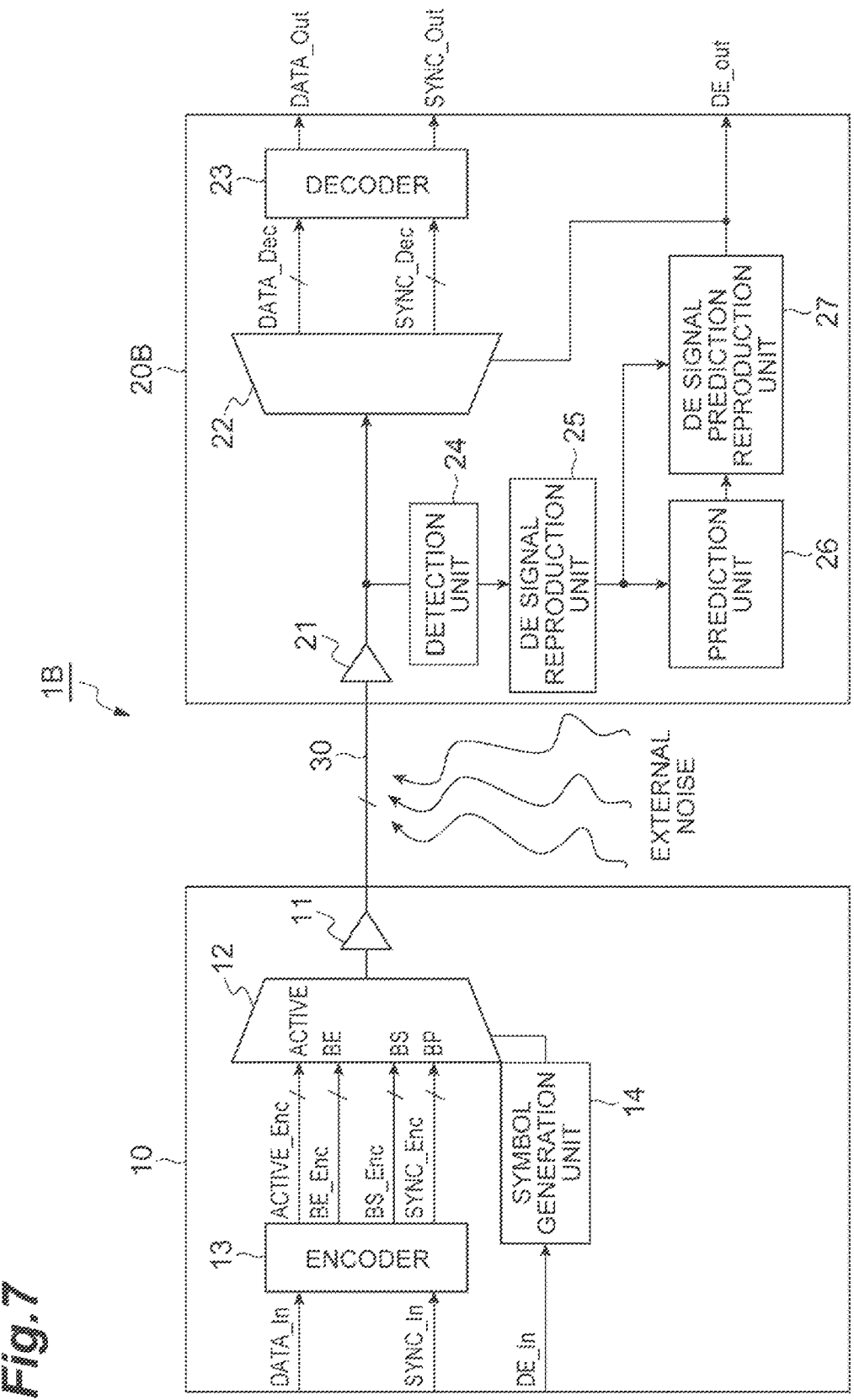
FIG. 7 is a diagram illustrating a configuration of a transmission/reception system 1B according to a second embodiment.

FIG. 7 is a diagram illustrating a configuration of a transmission/reception system 1B according to a second embodiment. Compared with the configuration of the transmission/reception system 1 according to the comparative example illustrated in FIG. 1, the transmission/reception system 1B according to the second embodiment illustrated in FIG. 7 differs from the transmission/reception system 1 according to the comparative example in that a reception device 20B is provided instead of the reception device 20. In addition, compared with the reception device 20 of the comparative example, the reception device 20B of the second embodiment differs from the reception device 20 of the comparative example in that a prediction unit 26 and a DE signal prediction reproduction unit 27 are further provided in addition to the DE signal reproduction unit 25. The other configuration of the transmission/reception system 1B according to the second embodiment is the same as the configuration of the transmission/reception system 1 according to the comparative example.

The DE signal reproduction unit 25 reproduces the DE signal on the basis of timings at which a detection unit 24 detected the BS data and the BE data. On the basis of information regarding transition timings of past intermediate DE signals including the DE signal (intermediate DE signal) generated by the DE signal reproduction unit 25 from timings at which the detection unit 24 detected the BS data and the BE data, the prediction unit 26 predicts a next timing at which the signal level of the DE signal should transit. The DE signal prediction reproduction unit 27 reproduces the DE signal (DE_Out) on the basis of timings at which the detection unit 24 detected the BS data and the BE data (that is, the intermediate DE signal generated by the DE signal reproduction unit 25) and a prediction result of the prediction unit 26 and gives this signal DE_Out to a demultiplexer 22.

The prediction unit 26 can employ a configuration including a first measurement unit (corresponding to the BS cycle counter 41 in FIG. 5) configured to measure a time interval of a timing at which the intermediate DE signal generated by the DE signal reproduction unit 25 transited from the H level to the L level, a second measurement unit (corresponding to the BE cycle counter 42 in FIG. 5) configured to measure a time interval of a timing at which the intermediate DE signal generated by the DE signal reproduction unit 25 transited from the L level to the H level, and a storage unit (corresponding to the BS cycle storage unit 45 and the BE cycle storage unit 46 in FIG. 5) configured to store a time measured by each of the first measurement unit and the second measurement unit. Alternatively, the prediction unit 26 may have a configuration including a measurement unit (corresponding to the cycle counter 51 in FIG. 6) configured to measure a first time during which the DE signal generated by the DE signal reproduction unit 25 is at the L level and also measure a second time during which the DE signal is at the H level, and a storage unit (corresponding to the BE-to-BS cycle storage unit 56 and the BS-to-BE cycle storage unit 57 in FIG. 6) configured to store the first time and the second time measured by the measurement unit.

Also in the reception device 20B having such a configuration, when the detection unit 24 cannot detect the BS data or the BE data at timings when these pieces of data should be received, the DE signal prediction reproduction unit 27 can reproduce the signal DE_Out on the basis of a timing predicted by the prediction unit 26. Therefore, the demultiplexer 22 can accurately separate the data DATA_Dec and SYNC_Dec and thus, video data displayed on a video display device that accepts the input of the data DATA_Out and SYNC_Out outputted from the reception device 20B can be prevented from being largely disturbed.

Third Embodiment

Figure 8:
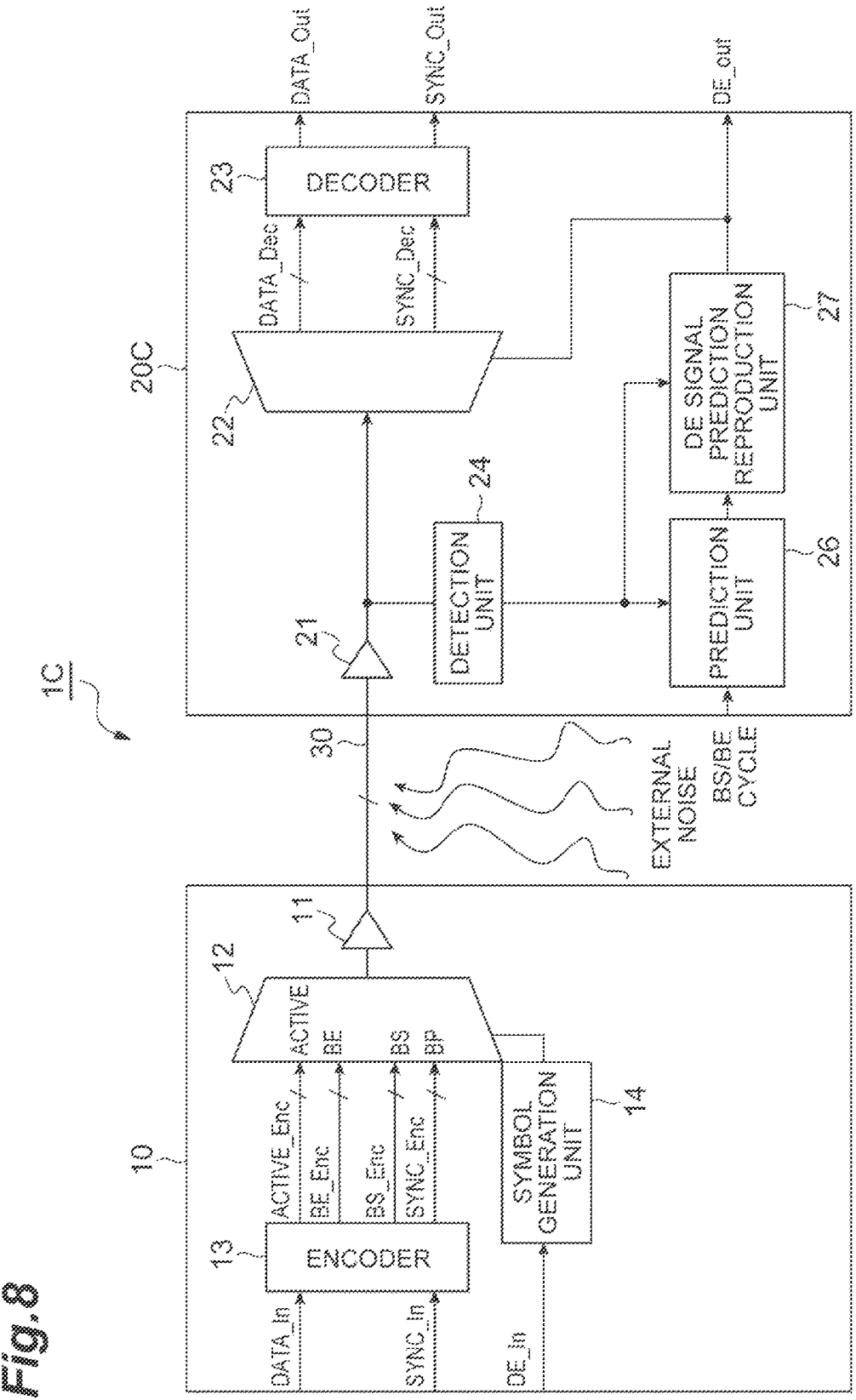
FIG. 8 is a diagram illustrating a configuration of a transmission/reception system 1C according to a third embodiment.

FIG. 8 is a diagram illustrating a configuration of a transmission/reception system 1C according to a third embodiment. Compared with the configuration of the transmission/reception system 1A according to the first embodiment illustrated in FIG. 3, the transmission/reception system 1C according to the third embodiment illustrated in FIG. 8 differs from the transmission/reception system 1A according to the first embodiment in that a reception device 20C is provided instead of the reception device 20A. In addition, compared with the reception device 20A of the first embodiment, the reception device 20C of the third embodiment differs from the reception device 20A of the first embodiment in the configuration of the prediction unit 26. The other configuration of the transmission/reception system 1C according to the third embodiment is the same as the configuration of the transmission/reception system 1A according to the first embodiment.

Figure 9:
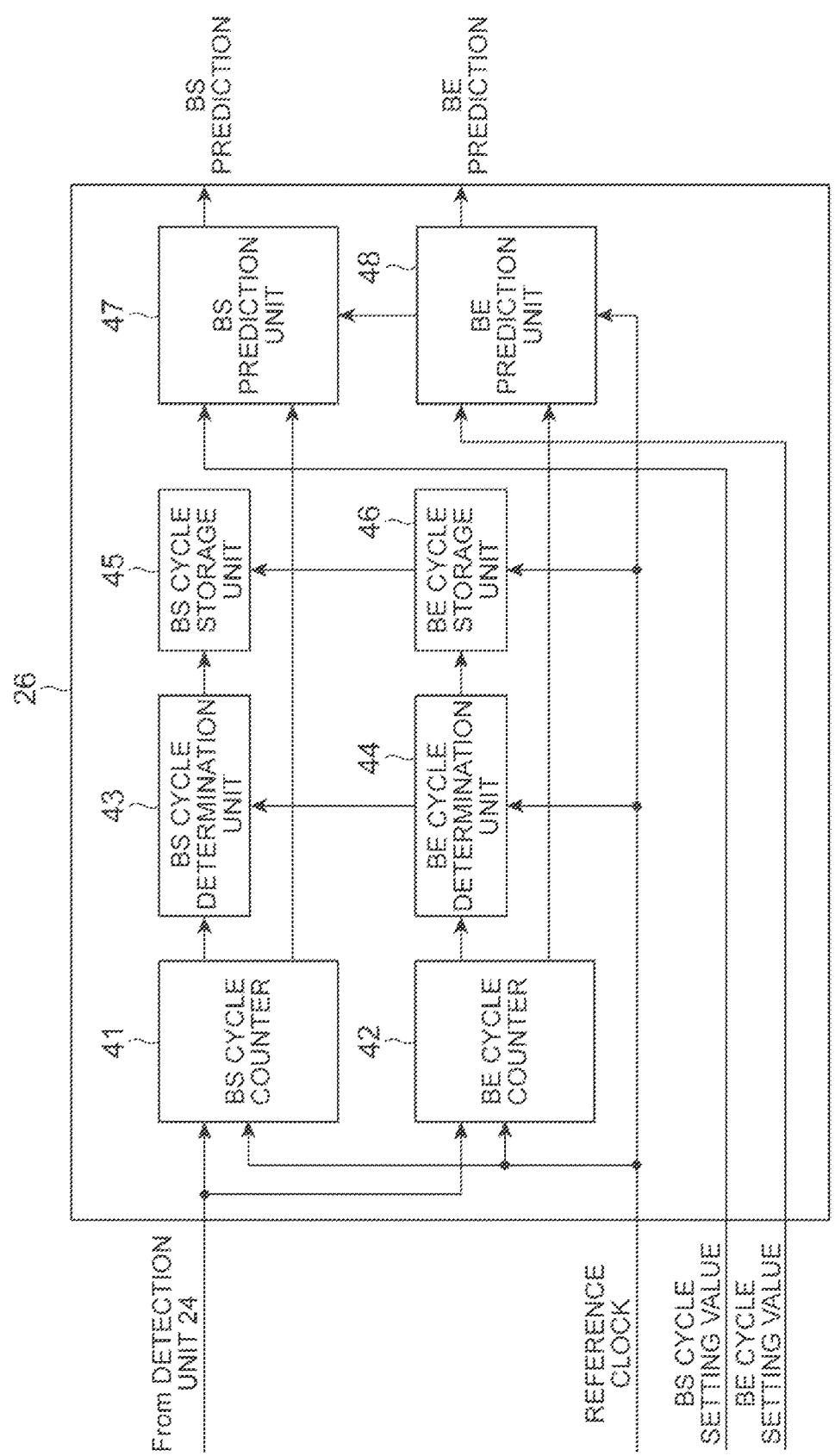
FIG. 9 is a diagram illustrating a configuration example of a prediction unit 26 of a reception device 20C according to the third embodiment.

FIG. 9 is a diagram illustrating a configuration example of a prediction unit 26 of the reception device 20C according to the third embodiment. In FIG. 9, the prediction unit 26 of the third embodiment can employ the configuration of the prediction unit 26 of the first embodiment illustrated in FIG. 5. In the third embodiment, a BS cycle determination unit 43, a BE cycle determination unit 44, a BS cycle storage unit 45, and a BE cycle storage unit 46 are turned off.

The prediction unit 26 of the third embodiment accepts the input of a BS data cycle setting value and a BE data cycle setting value from the outside to internally store and, on the basis of these setting values, predicts timings at which the detection unit 24 should detect the BS data and the BE data or a timing at which the signal level of the DE signal should transit. That is, the BS prediction unit 47 compares a count value by the BS cycle counter 41 (the cycle of BS data detection by the detection unit 24) with the externally set BS data cycle and predicts a timing at which the detection unit 24 should detect the BS data. The BE prediction unit 48 compares a count value by the BE cycle counter 42 (the cycle of BE data detection by the detection unit 24) with the externally set BE data cycle and predicts a timing at which the detection unit 24 should detect the BE data.

The configuration of the third embodiment is effective when the BE data cycle and the BS data cycle are fixed.

(Operation Examples of Reception Devices of Present Embodiments)

Figure 10:
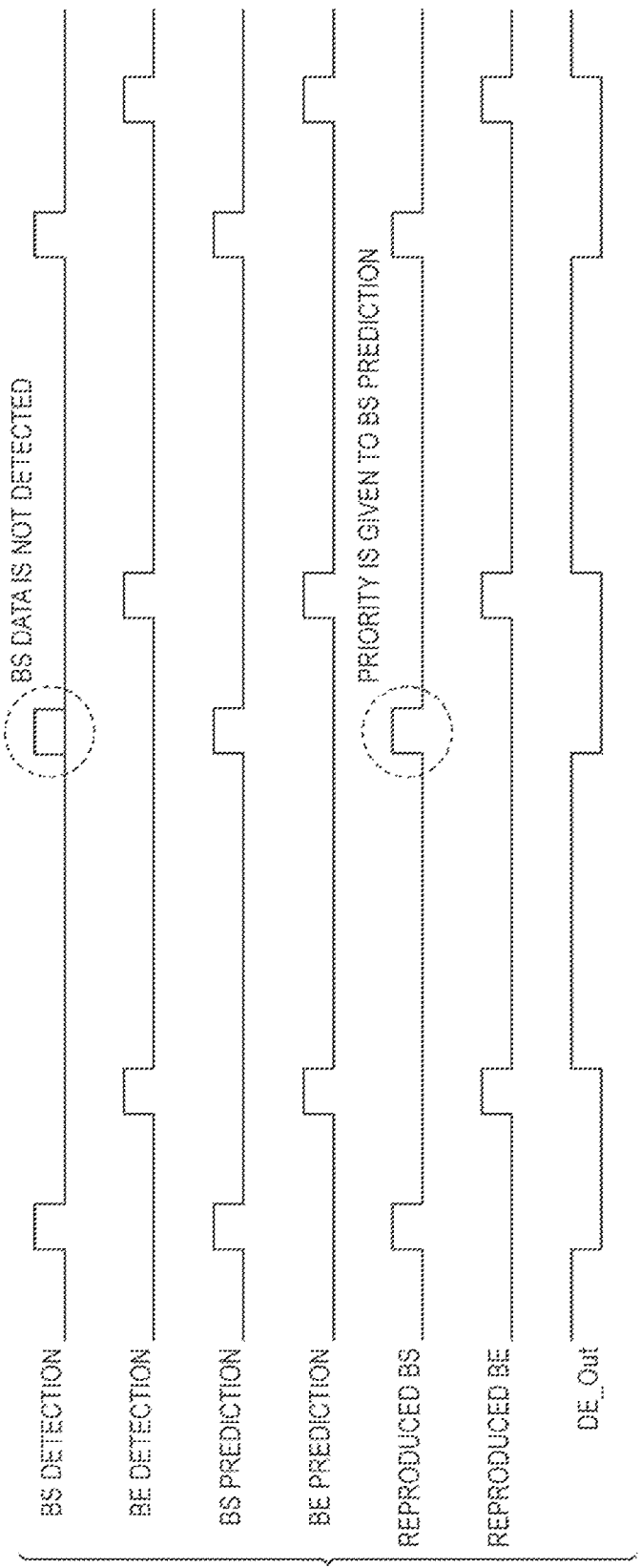
FIG. 10 is a timing chart for explaining a first operation example of the reception device according to the present embodiments.
Figure 11:
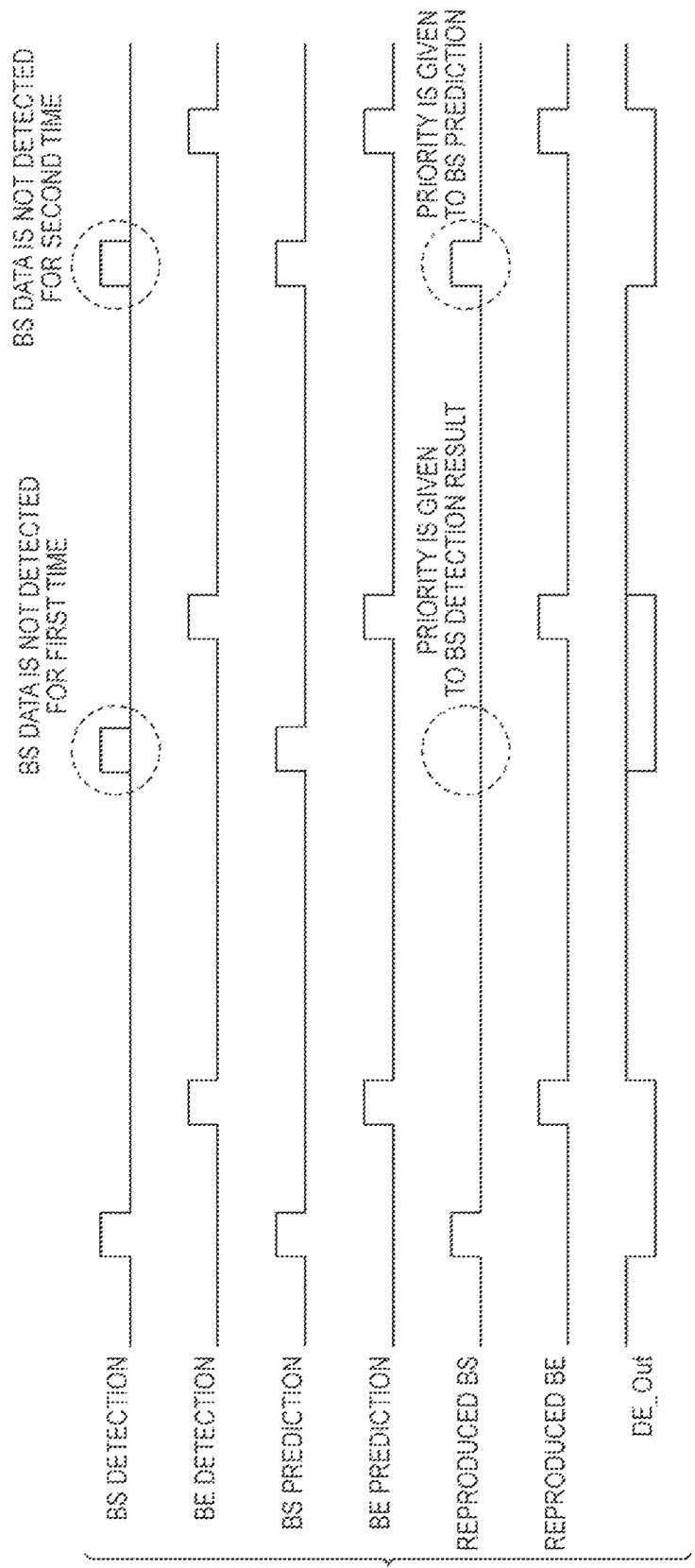
FIG. 11 is a timing chart for explaining a second operation example of the reception device according to the present embodiments.
Figure 12:
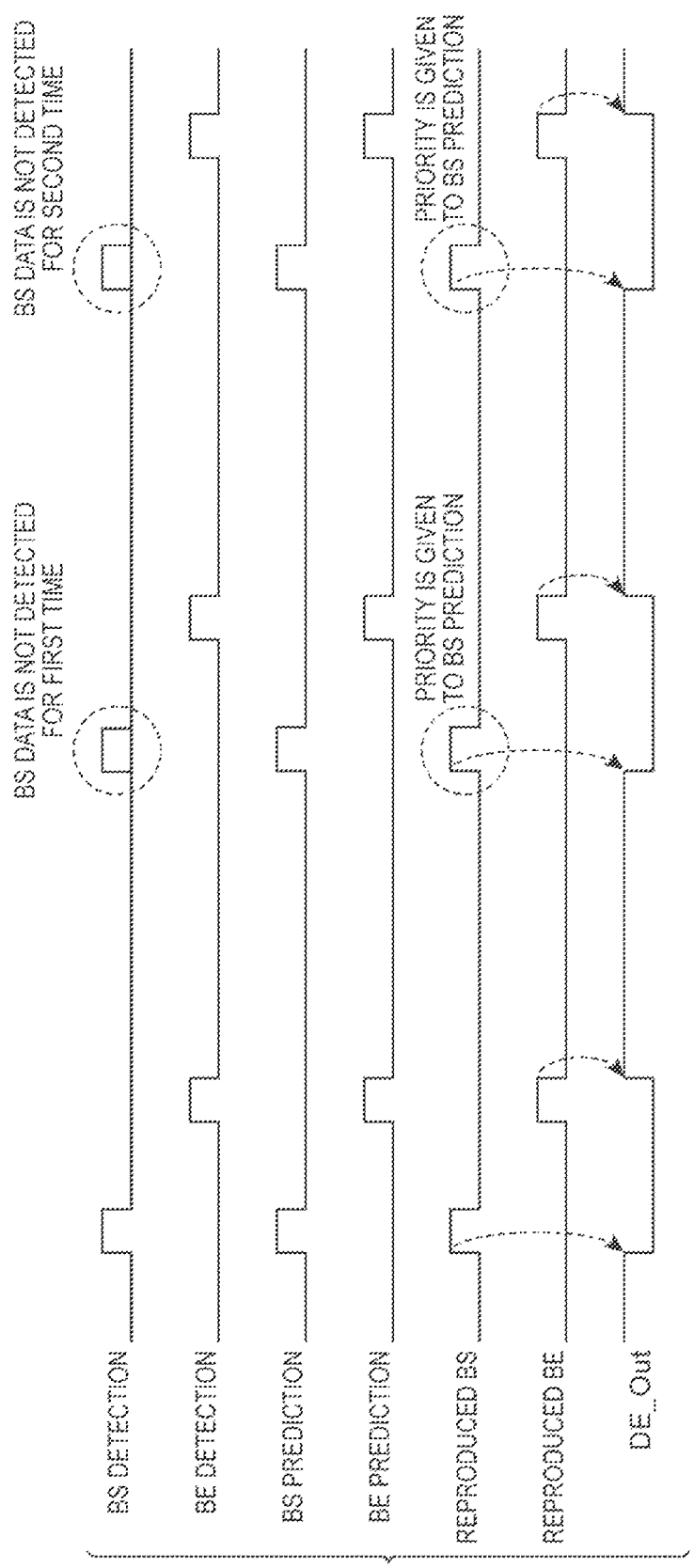
FIG. 12 is a timing chart for explaining a third operation example of the reception device according to the present embodiments.

Next, first to third operation examples of the reception devices of the present embodiments will be described with reference to FIGS. 10 to 12. In FIGS. 10 to 12, the BS data detection and the BE data detection by the detection unit 24, the BS data prediction and the BE data prediction by the prediction unit 26, the BS data, the BE data, and the signal DE_out reproduced by the DE signal prediction reproduction unit 27 are illustrated in order.

In the first operation example illustrated in FIG. 10, the DE signal prediction reproduction unit 27 compares timings at which the detection unit 24 detected the BS data and the BE data with a prediction result of the prediction unit 26 (a prediction timing for the BS data and a prediction timing for the BE data). Then, in a case where the both are different from each other, the DE signal prediction reproduction unit 27 reproduces the signal DE_Out on the basis of the prediction result of the prediction unit 26. On the other hand, in a case where the both are the same, the DE signal prediction reproduction unit 27 reproduces the signal DE_Out on the basis of the timings at which the detection unit 24 detected the BS data and the BE data.

In the second operation example illustrated in FIG. 11, the DE signal prediction reproduction unit 27 compares timings at which the detection unit 24 detected the BS data and the BE data with a prediction result of the prediction unit 26. Then, in a case where the both are continuously different from each other in the comparison between the both for a predetermined number of times (for example, twice) or more, the DE signal prediction reproduction unit 27 reproduces the signal DE_Out on the basis of the prediction result of the prediction unit 26. Meanwhile, in other cases, the DE signal prediction reproduction unit 27 reproduces the signal DE_Out on the basis of the timings at which the detection unit 24 detected the BS data and the BE data.

In the third operation example illustrated in FIG. 12, the DE signal prediction reproduction unit 27 reproduces the signal DE_Out by always giving priority to the prediction result of the prediction unit 26. Note that this third operation example is favorable as the operation of the reception device 20C of the third embodiment.

As described above, according to the present embodiments, even if the reception data changes due to noise, the video data and the SYNC data can be accurately separated from among the reception data.

What is claimed is:

1. A reception device configured to receive transmission data from a transmission device, the transmission data including video data sent out during a period in which a data enable signal is at a first level, SYNC data sent out during a period in which the data enable signal is at a second level and used for controlling display of the video data, BS data representing a timing at which the data enable signal transits from the first level to the second level, and BE data representing a timing at which the data enable signal transits from the second level to the first level, the reception device comprising:
   a detection unit, a prediction unit, a measurement unit, a determination unit, a DE signal prediction unit, and a separation unit;
   wherein the reception device is configured to detect the BS data and the BE data from among reception data captured into the reception device;
   wherein the reception device is configured to predict next timings at which the detection unit should detect the BS data and the BE data, on the basis of information regarding past timings detected by the detection unit, the prediction unit having a measurement unit that measures detection cycles of the detection unit for the BS data and the BE data, a determination unit that determines detection cycles to be stored out of the measured detection cycles, and a memory that stores the determined detection cycles as the information regarding the past timings detected by the detection unit;
   wherein the reception device is configured to reproduce the data enable signal using timings at which the detection unit detected the BS data and the BE data and a prediction result of the prediction unit; and
   wherein the reception device is configured to separate the video data and the SYNC data from among the reception data in accordance with the data enable signal reproduced by the DE signal prediction reproduction unit.

2. The reception device according to claim 1, wherein the measurement unit includes a first measurement unit and a second measurement unit:
   wherein the reception device is configured to measure a time interval of a timing at which the detection unit detected the BS data; and
   wherein the reception device is configured to measure a time interval of a timing at which the detection unit detected the BE data, and
   wherein the memory is configured to store the time interval measured by each of the first measurement unit and the second measurement unit.

3. The reception device according to claim 1, wherein the reception device is configured to measure a first time from detection of the BE data to detection of the BS data by the detection unit and also measure a second time from detection of the BS data to detection of the BE data by the detection unit, and
   wherein the memory is configured to store the first time and the second time measured by the measurement unit.

4. A reception device configured to receive transmission data from a transmission device, the transmission data including video data sent out during a period in which a data enable signal is at a first level, SYNC data sent out during a period in which the data enable signal is at a second level and used for controlling display of the video data, BS data representing a timing at which the data enable signal transits from the first level to the second level, and BE data representing a timing at which the data enable signal transits from the second level to the first level, the reception device comprising:
   a detection unit, a prediction unit, a measurement unit, a determination unit, a DE signal prediction unit, and a separation unit;
   wherein the reception device is configured to detect the BS data and the BE data from among reception data captured into the reception device;
   wherein the reception device is configured to predict a next timing at which a signal level of the data enable signal should transit, using information regarding transition timings of signal levels of past intermediate data enable signals including an intermediate data enable signal generated from timings at which the detection unit detected the BS data and the BE data, the prediction unit having a measurement unit that measures detection cycles of the detection unit for the BS data and the BE data, a determination unit that determines detection cycles to be stored out of the measured detection cycles, and a memory that stores the determined detection cycles as the information regarding the transition timings of signal levels of the past intermediate data enable signals;
   wherein the reception device is configured to reproduce the data enable signal using timings at which the detection unit detected the BS data and the BE data and a prediction result of the prediction unit; and
   wherein the reception device is configured to separate the video data and the SYNC data from among the reception data in accordance with the data enable signal reproduced by the DE signal prediction reproduction unit.

5. The reception device according to claim 4, wherein the measurement unit includes a first measurement unit and a second measurement unit;
   wherein the reception device is configured to measure a time interval of a timing at which the intermediate data enable signal transited from an H level to an L level; and
   wherein the reception device is configured to measure a time interval of a timing at which the intermediate data enable signal transited from the L level to the H level, and
   wherein the memory is configured to store the time interval measured by each of the first measurement unit and the second measurement unit.

6. The reception device according to claim 4, wherein the reception device is configured to measure a first time during which the intermediate data enable signal is at an L level and also measure a second time during which the intermediate data enable signal is at an H level, and
   wherein the memory is configured to store a first time and a second time measured by the measurement unit.

7. The reception device according to claim 1, wherein the reception device predicts timings at which the detection unit should detect the BS data and the BE data or a timing at which a signal level of the data enable signal should transit, using externally set data.

8. The reception device according to claim 1, wherein the reception device compares timings at which the detection unit detected the BS data and the BE data with a prediction result of the prediction unit and, in a case where the timings and the prediction result are different from each other, reproduces the data enable signal using the prediction result of the prediction unit, while reproducing the data enable signal using the timings at which the detection unit detected the BS data and the BE data in a case where the timings and the prediction result are the same.

9. The reception device according to claim 1, wherein the reception device compares timings at which the detection unit detected the BS data and the BE data with a prediction result of the prediction unit and, in a case where the timings and the prediction result are continuously different from each other in comparison for a predetermined number of times or more, reproduces the data enable signal using the prediction result of the prediction unit, while reproducing the data enable signal using the timings at which the detection unit detected the BS data and the BE data in other cases.

10. The reception device according to claim 7, wherein the reception device reproduces the data enable signal by always giving priority to the prediction result of the prediction unit.

11. A transmission/reception system comprising:
the transmission device configured to send out the video data, the SYNC data, the BS data, and the BE data; and
the reception device according to claim 1, configured to receive the video data, the SYNC data, the BS data, and the BE data sent out from the transmission device.

12. A transmission/reception system comprising:
the transmission device configured to send out the video data, the SYNC data, the BS data, and the BE data; and
the reception device according to claim 4, configured to receive the video data, the SYNC data, the BS data, and the BE data sent out from the transmission device.

* * * * *